(12) United States Patent
Pertsel (10) Patent No.: US 10,358,088 B1
(45) Date of Patent: Jul. 23, 2019

(54) DYNAMIC SURROUND CAMERA SYSTEM

(71) Applicant: Ambarella, Inc., Santa Clara, CA (US)

(72) Inventor: Shimon Pertsel, Mountain View, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/437,655

(22) Filed: Feb. 21, 2017

Related U.S. Application Data (63) Continuation of application No. 15/360,296, filed on Nov. 23, 2016, which is a continuation of application No. 13/951,548, filed on Jul. 26, 2013, now Pat. No. 9,538,077.

(51) Int. Cl.
| | |
|---|---|
| *H04N 5/268* | (2006.01) |
| *B60R 1/00* | (2006.01) |
| *H04N 7/18* | (2006.01) |
| *H04N 5/262* | (2006.01) |
| *G06K 9/00* | (2006.01) |
| *B60R 1/12* | (2006.01) |
| *B60K 35/00* | (2006.01) |

(52) U.S. Cl.
CPC .............. *B60R 1/00* (2013.01); *B60K 35/00* (2013.01); *B60R 1/12* (2013.01); *G06K 9/00798* (2013.01); *G06K 9/00805* (2013.01); *H04N 5/268* (2013.01); *H04N 5/2628* (2013.01); *H04N 7/181* (2013.01); *B60K 2350/106* (2013.01); *B60K 2350/1088* (2013.01); *B60K 2350/1096* (2013.01); *B60K 2350/2013* (2013.01); *B60K 2350/352* (2013.01); *B60K 2350/901* (2013.01); *B60R 2001/1253* (2013.01); *B60R 2300/105* (2013.01); *B60R 2300/301* (2013.01); *B60R 2300/607* (2013.01); *B60R 2300/804* (2013.01); *B60R 2300/806* (2013.01)

(58) Field of Classification Search
None
See application file for complete search history.

(56) References Cited

U.S. PATENT DOCUMENTS

| | | | |
|---|---|---|---|
| 6,124,647 A | 9/2000 | Marcus et al. | 307/10.1 |
| 7,432,800 B2 | 10/2008 | Harter et al. | 340/436 |
| 7,492,281 B2 * | 2/2009 | Lynam | B60Q 1/2665 340/904 |

(Continued)

OTHER PUBLICATIONS

"Xylon Test Vehicle Surround View Parking Assistance DA", https://www.youtube.com/watch?v=6fZ0jwTUNul, Apr. 13, 2011, 9 pages.

*Primary Examiner* — Edemio Navas, Jr.
(74) *Attorney, Agent, or Firm* — Christopher P. Maiorana, PC (57) ABSTRACT

A system comprising a plurality of camera sensors and a processor. The camera sensors may each be configured to generate a video signal having a view. The processor may be configured to (a) generate an output video signal by selecting one or more of the video signals and (b) present the selected output video signal to a display for viewing. The output video signal may be automatically selected in response to a selection signal. The selection signal may be generated in response to analysis of one or more images in the video signals. The analysis of the one or more images in the video signals may comprise determining an appropriate view for a driver. The processor may remove possible warping present in the video signals.

20 Claims, 5 Drawing Sheets

(56) References Cited

U.S. PATENT DOCUMENTS

| | | | |
|---|---|---|---|
| 9,126,525 B2* | 9/2015 | Lynam | B60Q 9/005 |
| 2002/0019703 A1 | 2/2002 | Levine | 701/301 |
| 2003/0169522 A1* | 9/2003 | Schofield | B60R 1/04 |
| | | | 359/876 |
| 2004/0073367 A1 | 4/2004 | Altan | 701/301 |
| 2004/0220705 A1 | 11/2004 | Basir et al. | 701/1 |
| 2005/0050344 A1 | 3/2005 | Hull | 713/193 |
| 2005/0062869 A1 | 3/2005 | Zimmermann et al. | 348/335 |
| 2006/0042851 A1 | 3/2006 | Hellmann | 180/271 |
| 2006/0164230 A1* | 7/2006 | DeWind | B60K 35/00 |
| | | | 340/461 |
| 2007/0061076 A1 | 3/2007 | Shulman | 701/213 |
| 2007/0153085 A1 | 7/2007 | Chang | 348/148 |
| 2007/0240060 A1 | 10/2007 | Berenbach | 715/723 |
| 2008/0150854 A1 | 6/2008 | Bryant et al. | 345/87 |
| 2008/0183342 A1 | 7/2008 | Kaufmann | 701/1 |
| 2009/0040297 A1* | 2/2009 | Harada | G02F 1/133509 |
| | | | 348/54 |
| 2009/0125234 A1 | 5/2009 | Geelen et al. | 701/533 |
| 2009/0174773 A1 | 7/2009 | Gowdy et al. | 348/148 |
| 2009/0268025 A1* | 10/2009 | Hiramaki | B60R 1/00 |
| | | | 348/148 |
| 2010/0238289 A1 | 9/2010 | Wu | 348/148 |
| 2011/0075889 A1 | 3/2011 | Huang | 382/107 |
| 2011/0115913 A1 | 5/2011 | Lang et al. | 348/148 |
| 2012/0033030 A1* | 2/2012 | Liu | H04N 7/15 |
| | | | 348/14.08 |
| 2012/0062743 A1 | 3/2012 | Lynam | 348/148 |
| 2012/0139816 A1* | 6/2012 | King | B60Q 9/00 |
| | | | 345/7 |
| 2012/0154591 A1 | 6/2012 | Baur et al. | 348/148 |
| 2013/0038472 A1* | 2/2013 | Gackstatter | B60W 30/0953 |
| | | | 340/902 |
| 2013/0120573 A1* | 5/2013 | Schumann | B60R 1/00 |
| | | | 348/148 |
| 2013/0135089 A1 | 5/2013 | Sejalon et al. | 340/435 |
| 2013/0141572 A1 | 6/2013 | Torres | 348/143 |
| 2013/0162625 A1 | 6/2013 | Schmit et al. | 345/419 |
| 2014/0347470 A1* | 11/2014 | Zhang | B60R 1/00 |
| | | | 348/118 |
| 2015/0015710 A1* | 1/2015 | Tiryaki | B60R 1/00 |
| | | | 348/148 |

* cited by examiner

DYNAMIC SURROUND CAMERA SYSTEM

This application relates to U.S. Ser. No. 15/360,296, filed Nov. 23, 2016, which relates to U.S. Ser. No. 13/951,548, filed Jul. 26, 2013, now U.S. Pat. No. 9,538,077, which are each incorporated by reference in their entirety.

FIELD OF THE INVENTION

The present invention relates to cameras used in automobiles generally and, more particularly, to a surround camera system that dynamically selects an appropriate view without input from a driver.

BACKGROUND OF THE INVENTION

Conventional automobiles use cameras to provide a driver with a view of an inconvenient location. Some conventional systems use cameras as an aid to a driver when backing up a car. Such cameras are sometimes mounted on a bumper to provide a view from the back of the vehicle. A screen to view images from such a camera is normally placed on a dashboard of the automobile. Such a system normally only shows the camera angle when the automobile is in reverse.

Minimizing driver distractions is important when integrating modern electronics into an automobile. If more than one camera is implemented, a conventional approach needs input from the user to select an appropriate camera view. For example, a driver manually selects either a back view or a side view. Manually switching between the views may distract a driver, which would be less than optimal when performing maneuvers such as parallel parking.

It would be desirable to implement a surround camera system that dynamically selects an appropriate camera view without input from a driver.

SUMMARY OF THE INVENTION

The present invention concerns a system comprising a plurality of camera sensors and a processor. The camera sensors may each be configured to generate a video signal having a view. The processor may be configured to (a) generate an output video signal by selecting one or more of the video signals and (b) present the selected output video signal to a display for viewing. The output video signal may be automatically selected in response to a selection signal. The selection signal may be generated in response to analysis of one or more images in the video signals. The analysis of the one or more images in the video signals may comprise determining an appropriate view for a driver. The processor may remove possible warping present in the video signals.

The objects, features and advantages of the present invention include providing a camera system that may (i) dynamically adjust a display to show an appropriate view, (ii) respond to a variety of conditions when selecting a view, (iii) place a priority on certain conditions when selecting a view and/or (iv) provide a manual override operation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
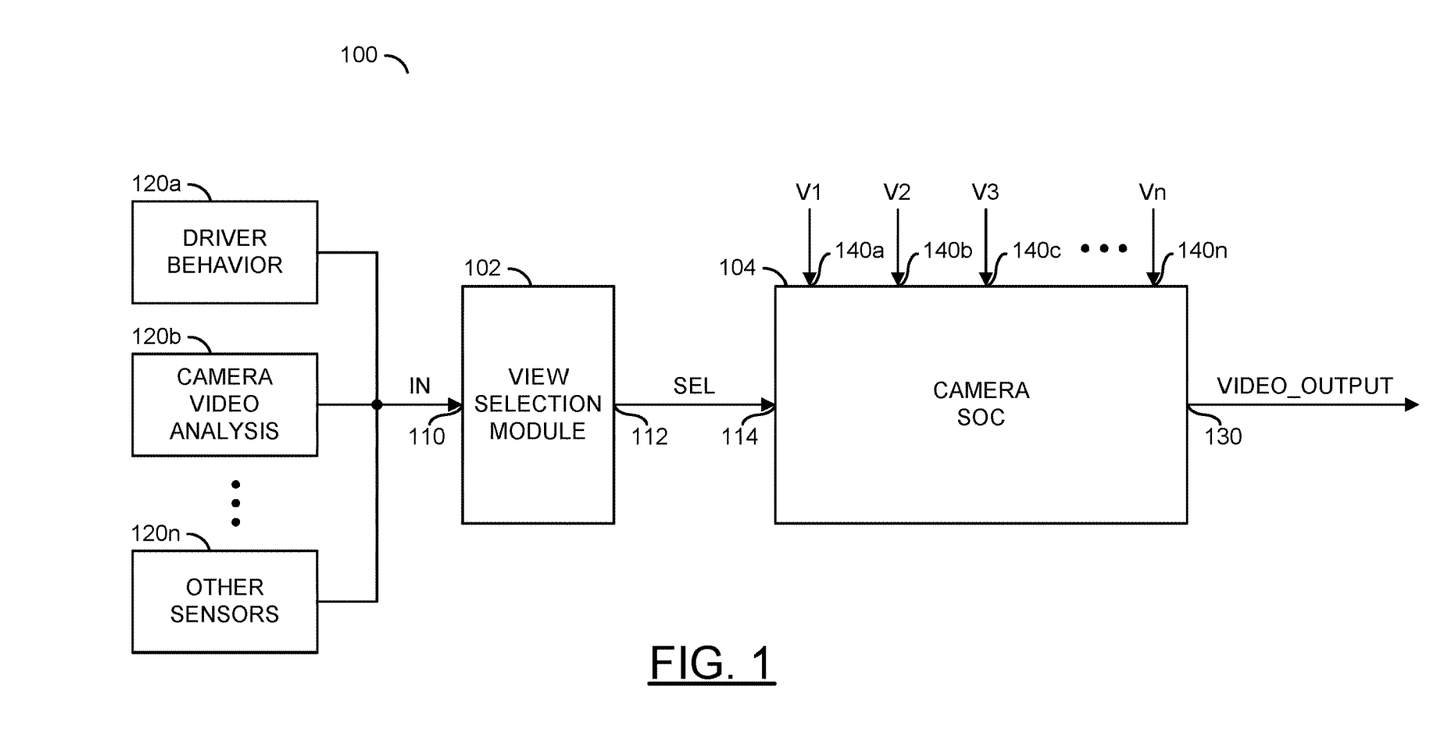
FIG. 1 is a block diagram of the embodiment of the invention.

Referring to FIG. 1, a block diagram of a system 100 is shown in accordance with an embodiment of the invention. The system 100 generally comprises a block (or circuit) 102 and a block (or circuit) 104. The circuit 102 may be a view selection module. The circuit 104 may be a processing module, such as a system on a chip (SoC) camera. The circuit 102 may have an input 110 that may receive a signal (e.g., IN) and an output 112 that may present a signal (e.g., SEL). The circuit 104 may have an input 114 that may receive the signal SEL. The signal IN may be received from one of a number of blocks (or circuits) 120*a*-120*n*. The circuits 120*a*-120*n* may generate a variety of information used by the circuit 102. For example, the circuit 120*a* may present information relating to driver behavior. The circuit 120*b* may provide camera video analysis. The circuit 120*n* may provide input from other sensors. The circuit 104 may have a number of inputs 140*a*-140*n*. The inputs 140*a*-140*n* may receive video signals (e.g., V1-Vn) from one or more cameras (to be described in more detail in connection with FIG. 2). The circuit 104 may have an output 130 that may present a signal (e.g., VIDEO OUTPUT).

Figure 2:
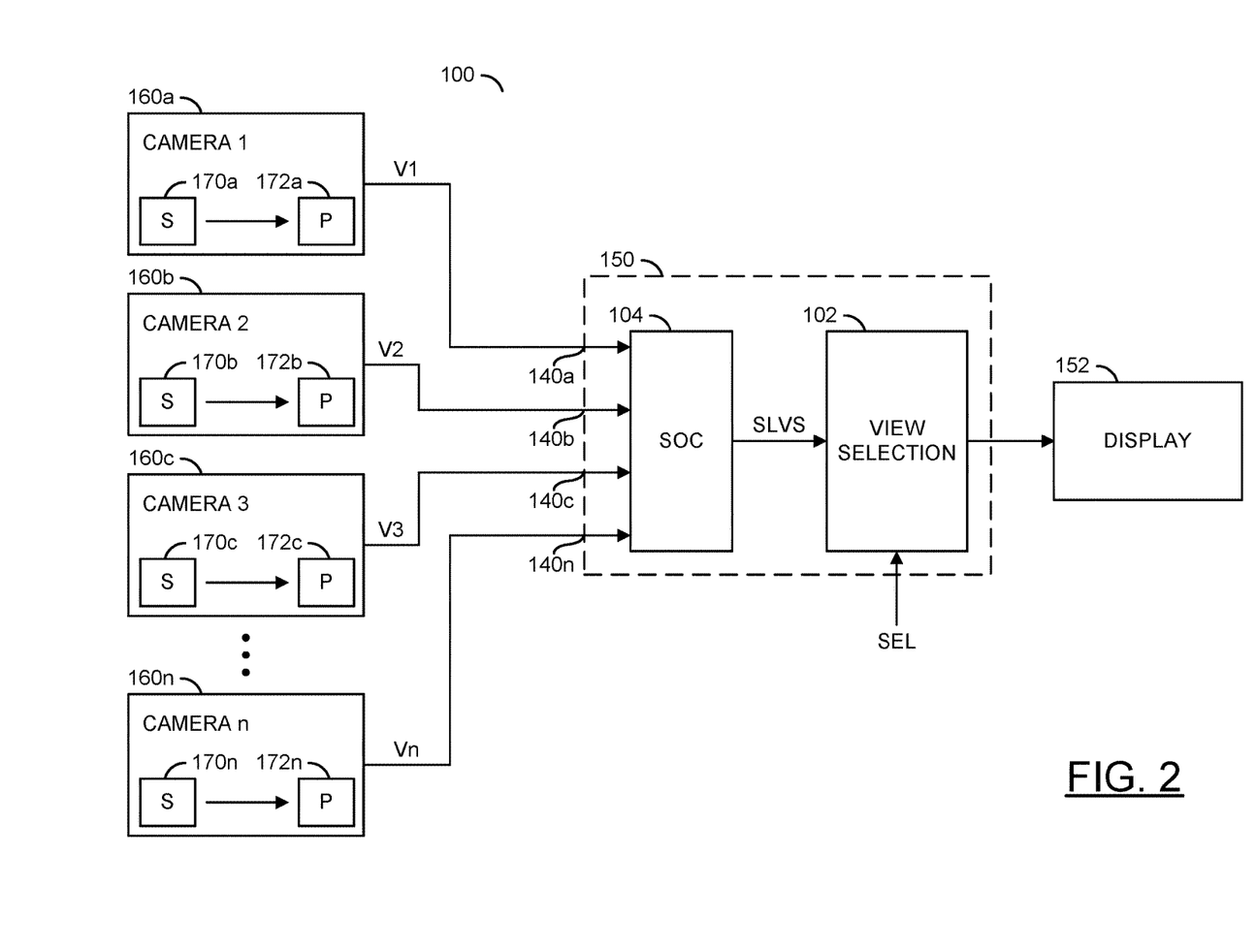
FIG. 2 is a more detailed diagram of the connections of the system.

Referring to FIG. 2, a more detailed diagram of the various connections to the circuit 102 and/or circuit 104 are shown. In general, the circuit 102 and the circuit 104 may be implemented as a processing block (or circuit) 150. In one example, the circuit 104 may be implemented on the same integrated circuit as the circuit 102. In another example, the circuit 102 may be implemented as a separate integrated circuit from the circuit 104. In another example, the circuit 102 may be hardware and/or firmware implemented as a subset of the circuit 104. A number of blocks (or circuits) 160*a*-160*n* are shown. The circuits 160*a*-160*n* may be implemented as camera modules. The circuit 160*a* may be implemented having a sensor 170*a* and a processing chip 172*a*. The cameras 160*b*-160*n* may have similar implementations. The camera modules 160*a*-160*n* may be connected to the processing block through a number of cables. The cables may be implemented as CAT5, CAT6, or other types of cables. The particular type of cabling used may be varied to meet the design criteria of a particular implementation.

The system 100 may provide a design to combine a surround camera that may be used for parking with a multi-channel recording system. The system 100 may generate a large number of video feeds from the camera modules 160*a*-160*n*. The system 100 may present different views.

The circuit 102 may be used to automatically select a preferred one of the video signals V1-Vn. The automatic selection avoids the need to have the driver manually switch through various camera views. The circuit 102 may incorporate analysis of video and/or driving information to define a number of rules used for selecting the best view to present to the driver. Information about the driving habits of a driver may be obtained by connecting the camera system through a controller area network (CAN) bus and/or an on board diagnostics (OBD) connector.

Figure 3:
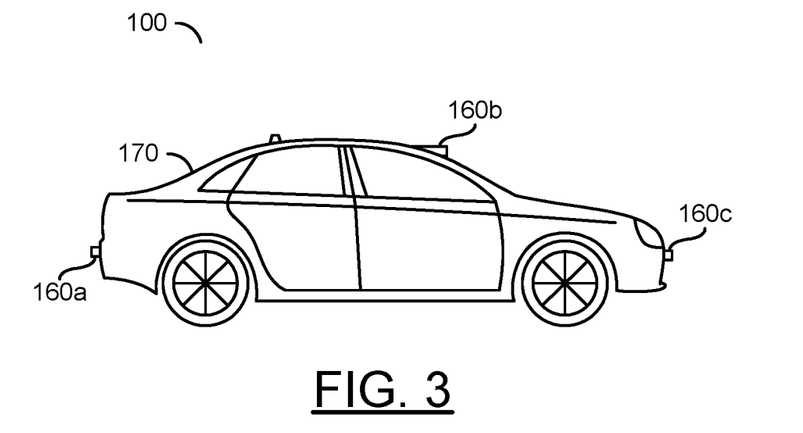
FIG. 3 is a side view of an automobile with multiple cameras installed.
Figure 4:
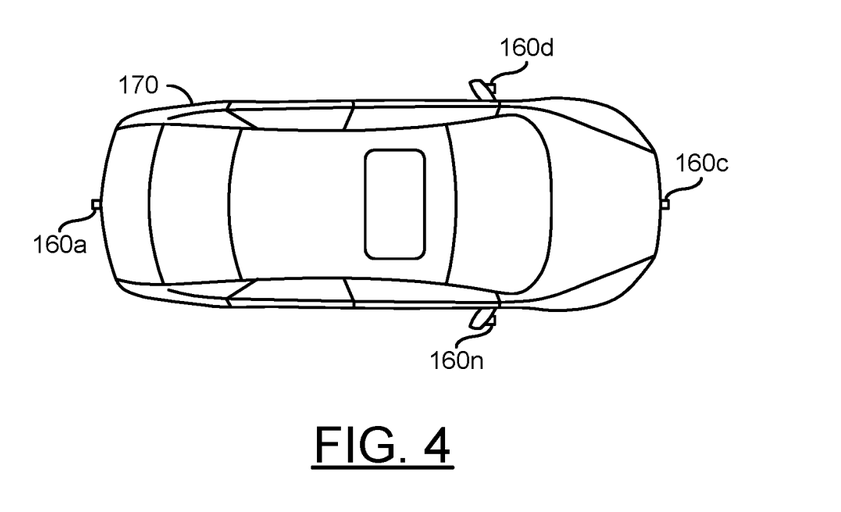
FIG. 4 is a top view of an automobile with multiple cameras installed.

Referring to FIG. 3, a side view of the system is shown. A vehicle 170 is shown with the cameras 160a, 160b and 160c. In FIG. 4 a top view is shown with the cameras 160d and 160n. The particular number of cameras 160a-160n implemented may be varied to meet the design criteria of a particular implementation. The vehicle 170 may be described as an automobile. However, the particular type of vehicle may be varied to meet the design criteria of a particular implementation. For example, the vehicle 170 may be a truck, or other type of vehicle operated by a driver.

Figure 5:
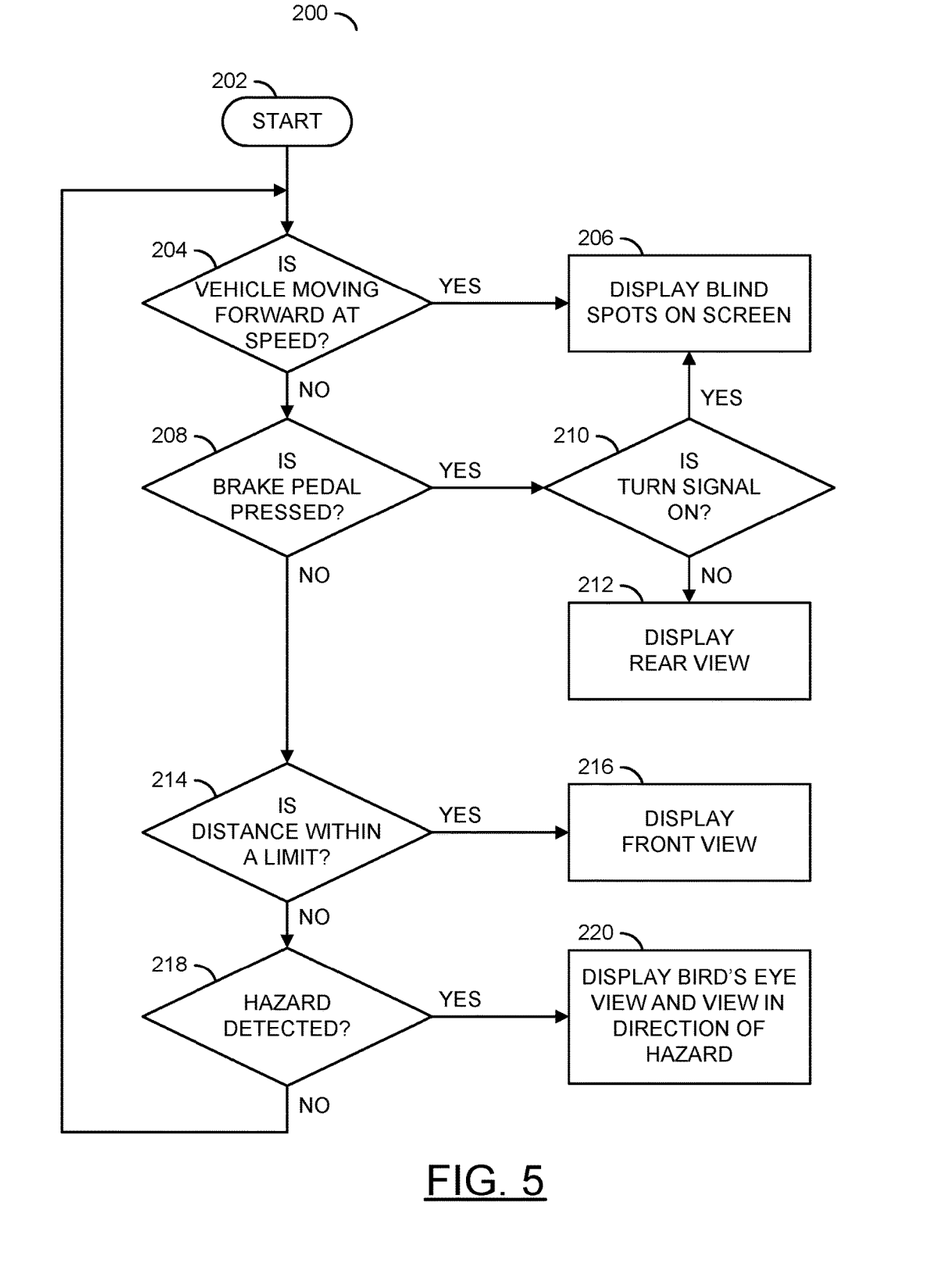
FIG. 5 is a flow diagram of a process for implementing the selection.

Referring to FIG. 5, a diagram of a method (or process) 200 is shown. The method 200 generally comprises a step (or state) 202, a decision step (or state) 204, a step (or state) 206, a decision step (or state) 208, a decision step (or state) 210, a step (or state) 212, a decision step (or state) 214, a step (or state) 216, a decision step (or state) 218, and a step (or state) 220. The state 202 may be a start state. In the decision state 204, the method 200 determines if the vehicle is moving forward at speed. If so, the method 200 moves to the state 206. If not, the method 200 moves to the state 208. In the state 206, the method 200 displays the blind spots on the screen. In the decision state 208, the method 200 determines if the brake pedal has been pressed. If so, the method 200 moves to the state 210. If not, the method 200 moves to the state 214. In the state 210, the method 200 determines if the turn signal is on. If so, the method 200 moves to the state 206. If not, the method 200 moves to the state 212. In the state 212, the method 200 displays the rear view. Next, in the decision state 214, the method 200 determines if a distance is within a limit. If so, the method 200 moves to the state 216. If not, the method 200 moves to the state 218. In the state 216, the method 200 displays the front view. In the state 218, the method 200 determines if a hazard has been detected. If so, the method 200 moves to the state 220. If not, the method 200 moves back to the state 204. In the state 220, the method 200 displays a bird's eye view and a view of the direction of the detected hazard.

Figure 6:
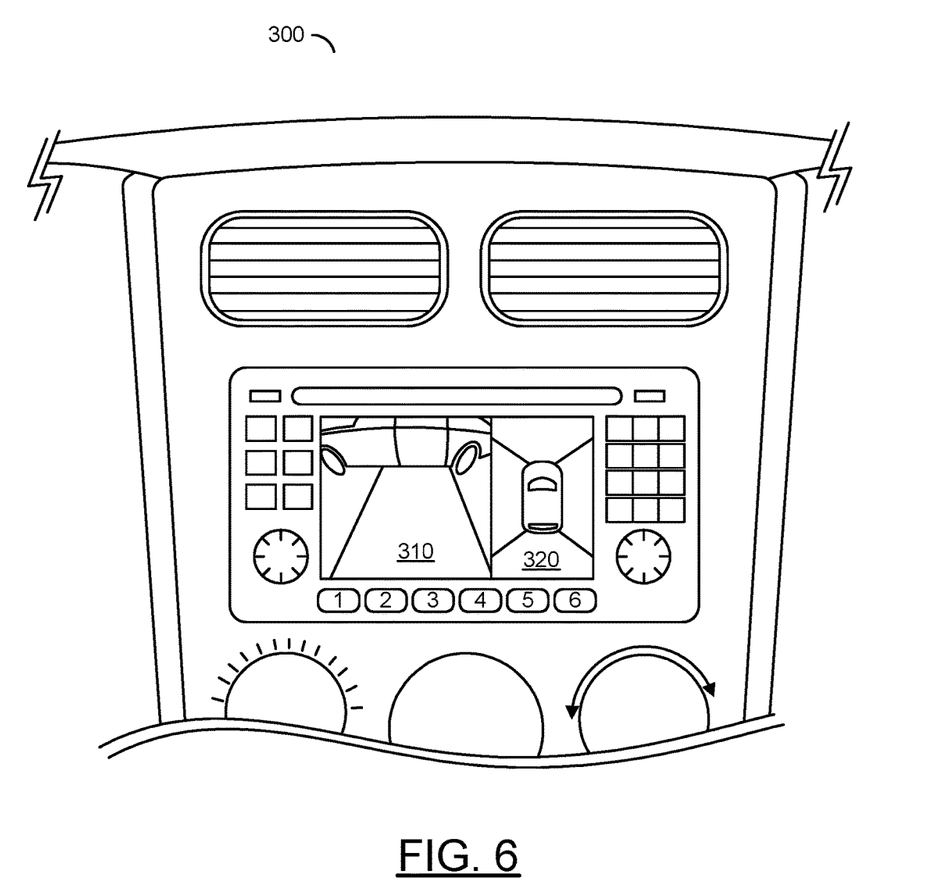
FIG. 6 is a diagram of a display that may be used with the invention.

Referring to FIG. 6, a diagram of a dashboard 300 is shown. The dashboard 300 includes a display 310 and a display 320. The dashboard 300 may be located so that the display 310 and the display 320 are at a conveniently viewable area when the driver of the automobile 170 is driving. While a two screen system is shown, a one screen system or a multi-screen system may be implemented.

Various rules may be implemented to select a desirable view. For example, while the automobile 170 is moving forward at cruising speed, the system 100 will present two blindspot views (left and right) on the screen 310 and the screen 320. In another example, if a brake pedal is pressed, the screen 310 or the screen 320 will present the rear view, unless the driver has a left or right turn indicator on. If a turn indicator is on, a blindspot view may override the system 100 and be presented.

In another example, if a distance between the vehicle 170 and another vehicle in front is judged to be dangerously small (e.g., less than a predetermined distance as calculated through a Front Collision Warning system), the front view is presented on the screen 310 and/or the screen 320 indicating another vehicle is in front of the automobile 170. In another example, if a reverse camera is enabled, the display 310 and/or the display 320 will show a bird's eye view and/or simultaneously present a rear view.

In another example, if the hazard is detected on any side of the automobile 170, the bird's eye view will be presented.

A view from the side of the detected hazard may also be presented if the speed is below a certain threshold. Otherwise, just the view from that side will be presented. The hazard can be detected using image analysis from the camera feed or through other means (e.g., a radar or proximity sensor in case of slower speeds).

The system 100 may also incorporate inputs to receive various other information. For example, infra-red, radar, lidar and/or proximity sensor inputs into the decision circuit 102 may be implemented. An alternative solution is to let the driver select the view by overriding the automatic sensors.

In one example, the view selection circuit 102 may be implemented as a module running on a central processing unit (CPU) of the video processor 104. The processor 104 may receive the video input signals V1-Vn and combine and/or select one or more of the signals V1-Vn to present on the display 152. In another example, the view selection circuit may be implemented on a separate CPU.

The view selection circuit 102 may incorporate one or more driver preferences as set by the driver. For example, the driver may change threshold speeds. The view selection circuit 102 may receive a signal used to monitor the driver (e.g., a camera pointed at the driver). The view selection circuit 102 may make a decision on which view to present based on a position of a head of the driver. A camera pointed at the driver is popular in taxis and/or for driver assistance to detect whether the driver is distracted. For example, if the driver is looking left consistently, the view selection circuit 102 may select a view from the left.

The circuit 150 may also receive one or more global positioning system (GPS) coordinates that may be used to select a view. For example, if the driver stops at a traffic light, the driver typically does not want to park. But if the driver approaches a garage at a known GPS location, the view selection circuit 102 may automatically turn on the parking mode (e.g., turn on the rear camera).

The processing circuit 150 may include knowledge of a vehicle. For example, knowledge of whether the vehicle is a left-sided steering wheel or a right-sided steering wheel vehicle may be used. For example, a blind spot view may be larger on the side where the steering wheel is located.

The view selection circuit 150 may incorporate and/or respond to acceleration information as well as speed information. For example, if a driver is gently braking at high speeds, the view selection circuit 102 may choose to not present a rear view. If the braking is abrupt, a rear view may be appropriate. In general, hysteresis may be implemented. For example, if there are mild moves to the left and right, such moves may be ignored. If the driver starts moving left (even if the left turn signal is not selected), the system 100 may make an assumption that the move left will continue. Inputs from a lane detection system may be included as an additional hysteresis. For example, if the driver starts getting too close to the left lane boundary, the system 100 will show the left blind spot, even if the left turn light has not been turned on and the driver is not steering left strongly.

The circuit 104 may be used to process one or more of video signals V1-Vn. The processing may provide de-warping and/or other processing to remove potential distortions found in a wide angle lens-type sensor. The de-warping may be implemented on one of the views without interrupting the generation of another of the views.

Each of the cameras 160a-160n may include a wide angle (e.g., 180 degree field of view or more) lens that may include full high definition (HD) (or higher) resolution sensors, pointed slightly downward. For example, a fish eye lens-type sensor may be implemented. The bottom portion of the video feed may be cropped and corrected for geometric distortion in the circuit 104 to generate the view showing the ground near the vehicle 170. In some embodiments, a central portion of the video feed may be cropped to generate the view. The resolution of each of the views may be increased or decreased, but may be sufficient for presenting a "bird's eye" display. For example, the feeds V1-Vn may be 1920× 600 lines of resolution. The SoC circuit 104 may combine a number of such feeds (e.g., 2, 4, 8, etc.) into a single bird's eye view. Standard resolutions used for recording may include 1920×1080, 1280×720, 640×480, 720×576, 720× 480, etc. However, the particular resolution implemented may be varied to meet the design criteria of a particular implementation. For the parking view, resolutions such as 640×480 or 800×600 or 1280×720 may be used. The parking view may be based on either the rear camera view, or by stitching together two or more smaller views in the circuit 104 from the various cameras 160a-160n. Each parking view may be relatively small, such as 640×200 or 480×200.

The circuit 150 may generate a full view by processing with a "dewarp" engine. A recorded frame may also be implemented for the various feeds. The recording signals V1-Vn do not normally need to be interrupted for displaying the parking mode signals V1-Vn. One or more of the recording signals V1-Vn may be used to provide driver assist analytics. For example, a lane departure warning may be implemented.

The functions performed by the diagram of FIG. 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multichip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:
1. A system comprising:
a plurality of camera sensors each configured to generate a video signal having a view; and
a processor configured to (a) generate an output video signal by selecting one or more of said video signals and (b) present said selected output video signal to a display for viewing, wherein (i) said output video signal is automatically selected in response to a selection signal, (ii) said selection signal is generated in response to analysis of one or more images in said video signals, (iii) said analysis of said one or more images in said video signals comprises determining an appropriate view to present on said display to be viewed by a driver, (iv) said processor removes possible warping present in said video signals, (v) said selection signal is generated in further response to rules based on a priority of conditions from (a) detection of a hazard determined in said analysis, (b) signals from a vehicle, (c) movements of said driver captured by one of said camera sensors, and (d) previous habits of said driver stored from said analysis, and (vi) said processor lowers said priority of mild movements of said driver determined from said analysis when generating said selection signal based on said rules.

2. The system according to claim 1, wherein said appropriate view comprises at least one of a bird's eye view and a view pointed in a direction of said detected hazard.

3. The system according to claim 1, wherein said selection signal is generated in further response to one or more external sensors comprising (i) an infra-red signal, (ii) a radar signal, (iii) a lidar signal, and (iv) a proximity sensor.

4. The system according to claim 1, wherein said system is configured to have a manual override to enable said driver to cause said selection signal to select one of said video signals not determined to be said appropriate view.

5. The system according to claim 1, wherein said system is configured to display both said appropriate view and a second view.

6. The system according to claim 1, wherein said processor is further configured to determine said appropriate view based on one or more driver preferences and said driver preferences include driver specific thresholds.

7. The system according to claim 1, wherein said selection signal is generated in further response to one or more global positioning system (GPS) coordinates.

8. The system according to claim 1, wherein said selection signal is generated in further response to characteristics of said vehicle.

9. The system according to claim 8, wherein said characteristics of said vehicle include a size of a blind spot and a side of the vehicle that a steering wheel is located.

10. The system according to claim 1, wherein (i) said signals from said vehicle are presented by a vehicle controller and (ii) said vehicle controller provides an acceleration of said vehicle.

11. The system according to claim 1, wherein said signals from said vehicle provide at least one of (i) an input received from a lane detection system and (ii) a predetermined distance calculated through a front collision warning system.

12. The system according to claim 1, wherein (A) said processor is further configured to (i) implement hysteresis and (ii) make assumptions based on previous input.

13. The system according to claim 1, wherein (i) said appropriate view is generated by said processor stitching together two or more smaller views and (ii) said smaller views are each generated by one of said camera sensors.

14. The system according to claim 1, wherein said rules are further based on a position of said driver.

15. A method for automatically selecting an output video signal to present to a driver of a vehicle, comprising the steps of:
  (A) receiving a plurality of video signals from a respective plurality of camera sensors;
  (B) generating said output video signal by selecting one or more of said video signals; and
  (C) presenting said selected output video signal to a display for viewing, wherein (i) said output video signal is automatically selected in response to a selection signal, (ii) said selection signal is generated in response to analysis of one or more images in said video signals, (iii) said analysis of said one or more images in said video signals comprises determining an appropriate view to present on said display to be viewed by said driver, (iv) possible warping present in said video signals is removed, (v) said selection signal is generated in further response to rules based on a priority of conditions from (a) detection of a hazard determined in said analysis, (b) signals from said vehicle, (c) movements of said driver captured by one of said camera sensors, and (d) previous habits of said driver stored from said analysis, and (vi) said processor lowers said priority of mild movements of said driver determined from said analysis when generating said selection signal based on said rules.

16. The method according to claim 15, wherein said method selects one of the video signals pointed at a blind-spot when said vehicle is moving forward.

17. The method according to claim 15, wherein said method displays a blindspot when the vehicle is moving forward at a predetermined speed.

18. The method according to claim 15, further comprising the steps of:
  determining when a brake pedal is pressed;
  determining when a turn signal is on;
  when both said brake pedal is pressed and said turn signal is on, displaying a blindspot; and
  when said brake pedal is pressed and said turn signal is not on, displaying a rear view.

19. The method according to claim 15, wherein analysis of the images in said video signals comprises defining a number of said rules used for selecting one of said video signals to present to said driver.

20. The method according to claim 15, wherein said method displays a bird's eye view and a view in a direction of said hazard when said hazard is detected.

* * * * *